(12) United States Patent
Morin et al.

(10) Patent No.: US 12,009,472 B2
(45) Date of Patent: Jun. 11, 2024

(54) LONG CYCLE-LIFE WOUND LITHIUM-ION BATTERY CELLS HAVING METALLIZED FILM CURRENT COLLECTORS

(71) Applicant: Soteria Battery Innovation Group, Inc., Greenville, SC (US)

(72) Inventors: Brian G Morin, Greenville, SC (US); Carl C. Hu, Taylors, SC (US); Drew J. Pereira, Greenville, SC (US)

(73) Assignee: Soteria Battery Innovation Group Inc., Greenville, SC (US)

( * ) Notice: Subject to any disclaimer, the term of this patent is extended or adjusted under 35 U.S.C. 154(b) by 0 days.

(21) Appl. No.: 17/744,855

(22) Filed: May 16, 2022

(65) Prior Publication Data

US 2023/0369638 A1 Nov. 16, 2023

(51) Int. Cl.
*H01M 10/0525* (2010.01)
*H01M 4/04* (2006.01)
*H01M 4/66* (2006.01)
*H01M 10/04* (2006.01)

(52) U.S. Cl.
CPC ..... *H01M 10/0525* (2013.01); *H01M 4/0404* (2013.01); *H01M 4/661* (2013.01); *H01M 4/667* (2013.01); *H01M 10/0422* (2013.01); *H01M 10/0431* (2013.01)

(58) Field of Classification Search
CPC ........................ H01M 10/0431; H01M 10/0422
See application file for complete search history.

(56) References Cited

U.S. PATENT DOCUMENTS

| | | | | |
|---|---|---|---|---|
| 7,195,840 | B2* | 3/2007 | Kaun | H01M 10/04 429/130 |
| 2012/0088136 | A1* | 4/2012 | Kogetsu | H01M 50/531 429/94 |
| 2022/0200004 | A1* | 6/2022 | Hu | H01M 10/052 |

FOREIGN PATENT DOCUMENTS

WO   WO 2019051121   * 3/2019

* cited by examiner

*Primary Examiner* — Lisa S Park
(74) *Attorney, Agent, or Firm* — William S. Parks

(57) ABSTRACT

A constrained, wound lithium-ion battery cell with an internal fuse component that exhibits significant improvements in terms of life-cycle times is provided. Disclosed herein are lithium-ion battery structures and configurations utilizing at least one thin metallized film current collector that provides safety features with low thermal runaway potential, low internal resistance, with a simplified manner of providing external electrical conductivity simultaneously. The provision of a highly constrained and wound structure thereof unexpectedly allows for extended charge/discharge cycle life that is significantly improved in comparison with previous wound lithium-ion battery devices. A range of shear and compression forces accords such results, with such forces permissible through various pathways, including winding curvatures, number of windings within the cell housing, hardness of housing, and structural geometries therein. Encompassed herein is also a method of providing long cycle life results for such specific devices.

13 Claims, 17 Drawing Sheets

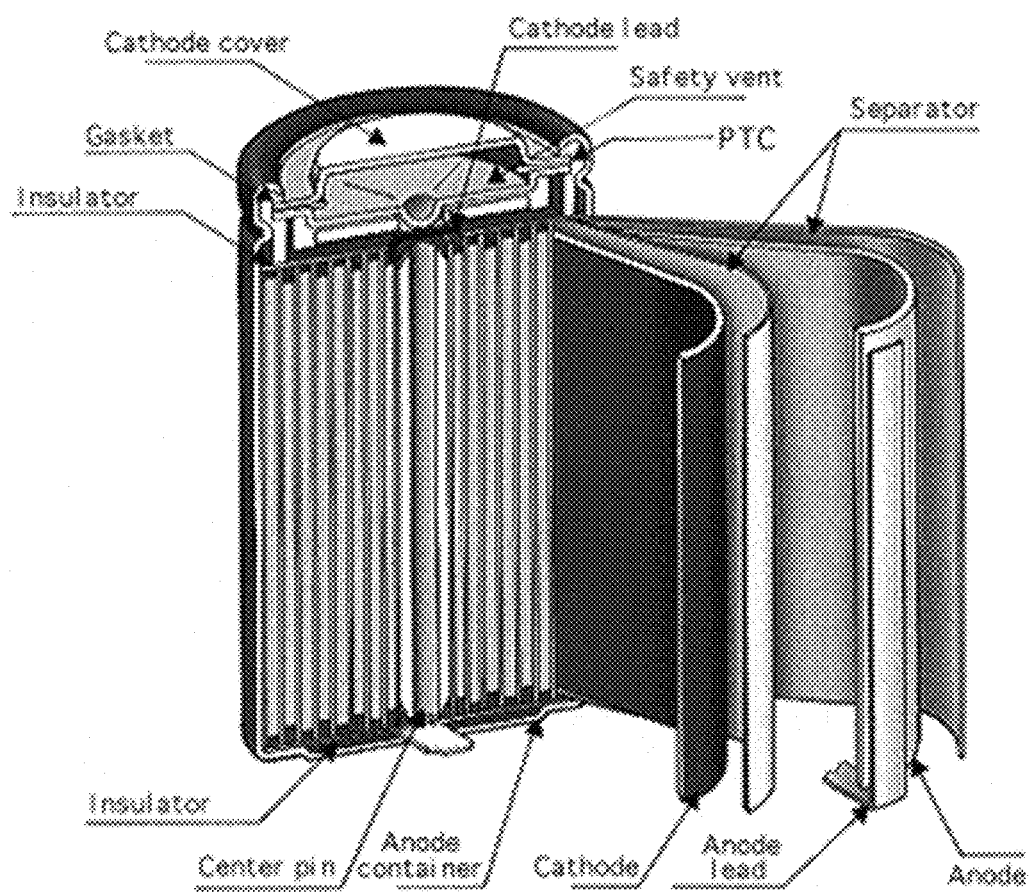
Fig. 1: Wound Cell
Prior Art

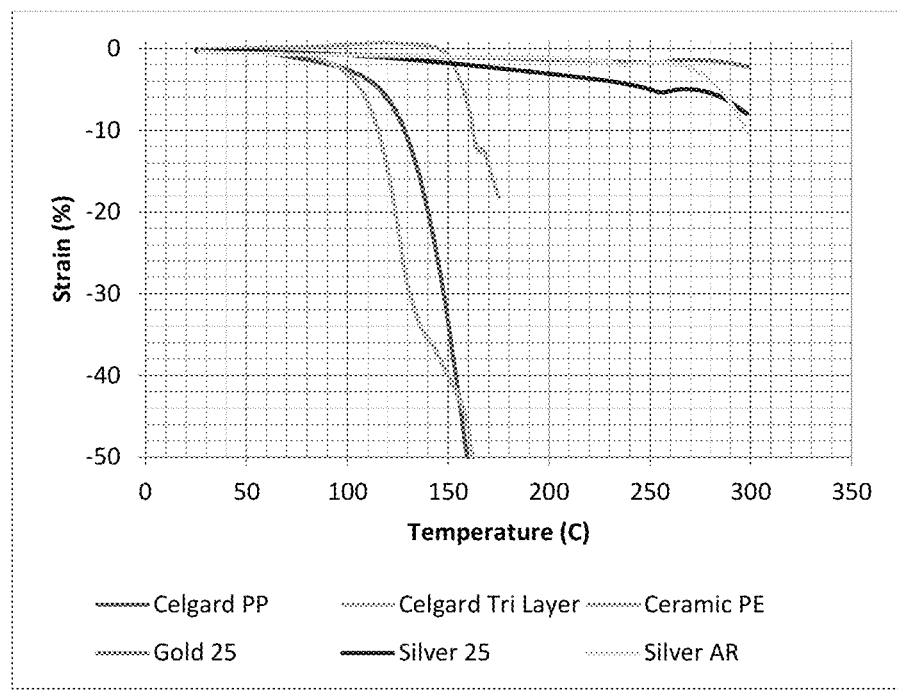
Fig. 2: Separator Shrinkage
Prior Art

SEM of cross section of nail-penetrated cell
Prior Art

An oxidizing metal at very low total metal thickness

Metallized Film

Comparative Example 1 after touching with hot solder iron

Comparative Example 2 after touching with hot solder iron

Example 1 after touching with hot solder iron

Example 2 after touching with hot solder iron

Example 3 after touching with hot solder iron

Example 4 after touching with hot solder iron

Example 5 after touching with hot solder iron

Example 6 after touching with hot solder iron

Rolled Cell prior to insertion into case

Wound cell electrodes and separators prior to winding

Wound cell in case prior to sealing

Wound cell with curvature of X cm in case prior to sealing

Wound cell within a hard case

Metallized film cell life vs. conventional foil cell

Metallized Film Cell vs Conventional Foil Cell

LONG CYCLE-LIFE WOUND LITHIUM-ION BATTERY CELLS HAVING METALLIZED FILM CURRENT COLLECTORS

FIELD OF THE DISCLOSURE

A constrained, wound lithium-ion battery cell with an internal fuse component that exhibits significant improvements in terms of life-cycle times is provided. Disclosed herein are lithium-ion battery structures and configurations utilizing at least one thin metallized film current collector that provides safety features with low thermal runaway potential, low internal resistance, with a simplified manner of providing external electrical conductivity simultaneously. The provision of a highly constrained and wound structure thereof unexpectedly allows for extended charge/discharge cycle life that is significantly improved in comparison with previous wound lithium-ion battery devices. A range of shear and compression forces accords such results, with such forces permissible through various pathways, including winding curvatures, number of windings within the cell housing, hardness of housing, and structural geometries therein. Encompassed herein is also a method of providing long cycle life results for such specific devices.

Additionally, the internal fuse developments disclosed herein, exhibiting extremely thin current collector structures, further allow for the potential for repetitive folds and/or windings thereof within a single cell. Such a fold and/or winding possibility provides the capability of connecting two sides of a current collector which might otherwise be electrically insulated by a polymer layer situated between the two conducting layers, without the need for excessive internal weight and/or battery volume requirements. Ostensibly, the folded and/or wound current collector retains the internal fuse characteristics while simultaneously permitting for such high current capability, potentially allowing for very high power within any number of sized batteries without the need for the aforementioned excessive weight and volume requirements, creating new battery articles for different purposes with targeted high-power levels and as high safety benefits as possible. Additionally, such folded and/or wound batteries also exhibit constrained configurations that have been found to impart unexpectedly improved cycle life benefits heretofore unknown within this industry.

BACKGROUND OF THE PRIOR ART

Lithium batteries remain prevalent around the world as an electricity source within a myriad of products. From rechargeable power tools to electric cars to the ubiquitous cellular telephone (and like tablets, hand-held computers, etc.), lithium batteries (of different cathode types) are utilized as the primary power source due to reliability, above noted rechargeability, and longevity of usage. With such widely utilized power sources, however, comes certain problems, some of which have proven increasingly serious. Notably, safety issues have come to light wherein certain imperfections within such lithium batteries, whether due to initial manufacturing issues or time-related degradation problems, cause susceptibility to firing potentials during short circuit events. Basically, internal defects with conductive materials have been found to create undesirable high heat and, ultimately, fire, within such battery structures. As a result, certain products utilizing lithium batteries, from hand-held computerized devices (the Samsung Galaxy Note 7, as one infamous situation) to entire airplanes (the Boeing 787) have been banned from sales and/or usage until solutions to compromised lithium batteries used therein and therewith have been provided (and even to the extent that the Samsung Galaxy Note 7 has been banned from any airplanes in certain regions). Even the Tesla line of electric cars have exhibited notable problems with lithium battery components, leading to headline-grabbing stories of such expensive vehicles exploding as fireballs due to battery issues. Widespread recalls or outright bans thus remain today in relation to such lithium battery issues, leading to a significant need to overcome such problems.

These problems primarily exist due to manufacturing issues, whether in terms of individual battery components as made or as such components are constructed as individual batteries themselves. Looked at more closely, lithium batteries are currently made from six primary components, a cathode material, a cathode current collector (such as aluminum foil) on which the cathode material is coated, an anode material, an anode current collector (such as copper foil) on which the anode material is coated, a separator situated between each anode and cathode layer and typically made from a plastic material, and an electrolyte as a conductive organic solvent that saturates the other materials thereby providing a mechanism for the ions to conduct between the anode and cathode. These materials are typically wound together into a can, as shown in Prior Art FIG. 1, or stacked. There are many other configurations that are and may be utilized for such battery production purposes, including pouch cells, prismatic cells, coin cells, cylindrical cells, wound prismatic cells, wound pouch cells, and the list goes on. These battery cells, when made correctly and handled gently, can provide energy for various applications for thousands of charge-discharge cycles without any appreciable safety incident. However, as alluded to above, certain events and in particular certain defects can cause internal shorting between the internal conductive materials which can lead to heat generation and internal thermal runaway, known to be the ultimate cause of fire hazards within such lithium batteries. Such events may further be caused by, as noted above, internal defects including the presence of metallic particles within the battery, burrs on the current collector materials, thin spots or holes in the separator (whether included or caused during subsequent processing), misalignments of battery layers (leaving "openings" for unwanted conductivity to occur), external debris penetrating the battery (such as road debris impacting a moving vehicle), crushing and/or destabilizing of the cell itself (due to accidents, for instance), charging the cell in a confined space, and the like. Generally speaking, these types of defects are known to cause generation of a small electronic conductive pathway between the anode and cathode. When such an event occurs, a conductive pathway may then cause a discharge of the cell through which ultimately generates excessive heat, thereby compromising the battery structure and jeopardizing the underlying device being powered thereby. Combined with the presence of flammable organic solvent materials as battery electrolytes (which are generally of necessity for battery operability), such excessive heat has been shown to cause ignition thereto, ultimately creating a very dangerous situation. Such problems are difficult to control once started, at the very least, and have led to significant injuries to consumers. Such a potential disastrous situation is certainly to be avoided through the provision of a battery that delivers electrical energy while not compromising the flammable organic electrolyte in such a manner.

The generation of excessive heat internally may further create shrinkage of the plastic separator, causing it to move away from, detach, or otherwise increase the area of a short within the battery. In such a situation, the greater exposed short area within the battery may lead to continued current and increased heating therein, leading to the high temperature event which causes significant damage to the cell, including bursting, venting, and even flames and fire. Such damage is particularly problematic as the potential for firing and worse comes quickly and may cause the battery and potentially the underlying device to suffer an explosion as a result, putting a user in significant danger as well.

Lithium batteries (of many varied types) are particularly susceptible to problems in relation to short circuiting. Typical batteries have a propensity to exhibit increased discharge rates with high temperature exposures, leading to uncontrolled (runaway) flaring and firing on occasion, as noted above. Because of these possibilities, certain regulations have been put into effect to govern the actual utilization, storage, even transport of such battery articles. The ability to effectuate a proper protocol to prevent such runaway events related to short circuiting is of enormous importance, certainly. The problem has remained, however, as to how to actually corral such issues, particularly when component production is provided from myriad suppliers and from many different locations around the world.

Some past investigations aimed at overcoming such issues have focused on trying to provide proper and/or improved separators as a means to help alleviate potential for such lithium battery fires. Low melting point and/or shrinkage rate plastic membranes appear to create higher potentials for such battery firing occurrences. The general thought has then been to include certain coatings on such separator materials without reducing the electrolyte separation capabilities thereof during actual utilization. Thus, ceramic particles, for instance, have been utilized as polypropylene and/or polyethylene film coatings as a means to increase the dimensional stability of such films (increase melting point, for example). Binder polymers have been included, as well, as a constituent to improve cohesion between ceramic particles and adhesion to the plastic membrane (film). In actuality, though, the thermal increase imparted to the overall film structure with ceramic particle coatings has been found to be relatively low, thus rendering the dominant factor for such a separator issue to be the actual separator material(s) itself.

As a result, there have been designed and implemented, at least to a certain degree, separator materials that are far more thermally stable than the polyethylene and polypropylene porous films that make up the base layer of such typical ceramic-coated separators. These low shrinkage, dimensionally stable separators exhibit shrinkage less than 5% when exposed to temperatures of at least 200° C. (up to temperatures of 250, 300, and even higher), far better than the high shrinkage rates exhibited by bare polymer films (roughly 40% shrinkage at 150° C.), and of ceramic-coated films (more than 20% at 180° C.) (such shrinkage measurement comparisons are provided in Prior Art FIG. 2). Such low shrinkage rate materials may change the mechanism of thermal degradation inside a target cell when a short occurs. Generally speaking, upon the occurrence of a short within such a battery cell, heat will always be generated. If the separator does not shrink in relation to such a short circuit event, heat will continue to be generated and "build up" until another material within the battery degrades. This phenomenon has been simulated with an industry standard nail penetration test. For instance, even with a separator including para-aramid fiber and exhibiting a shrinkage stability up to 550° C., the subject test battery showed a propensity to short circuit with unique internal results. Such a cell was investigated more closely subsequent to such treatment wherein the cell was opened, the excess electrolyte was evaporated, the cell filled with epoxy and then sectioned perpendicular to the nail, which was left in the cell. Scanning electron microscope images were then undertaken using backscattered electron imaging (BEI), which enabled mapping of the different battery elements to show the effect of such a nail penetration activity. These are shown in Prior Art FIGS. 3A and 3B.

In Prior Art FIG. 3A, it is noted that the copper layers consistently come closer to the nail than the aluminum layers. It is also noted that the high stability separator is still intact between the electrodes. Prior Art FIG. 3B shows a higher magnification of the end of one aluminum layer, showing that it ends in a layer of cracked grey matter. This was investigated with BEI, which showed the resultant matter to actually be aluminum oxide, an insulating ceramic. Such evidence led to the proposed conclusion that when the separator itself is thermally stable, the aluminum current collector will oxidize, effectively breaking the circuit (and stopping, as a result, any short circuit once the insulating aluminum oxide is formed). Once the circuit is broken, the current stops flowing and the heat is no longer generated, reversing the process that, with less stable separators, leads to thermal runaway.

This possible solution, however, had typically been limited to simply replacing the separator alone with lower shrinkage rate characteristics. Although such a simple resolution would appear to be of great value, there still remained other manufacturing procedures and specified components (such as ceramic-coated separator types) that are widely utilized and may be difficult to supplant from accepted battery products. Thus, despite the obvious benefits of the utilization and inclusion of thermally stable separators, undesirable battery fires may still occur, particularly when ceramic coated separator products are considered safe for such purposes.

It was then discovered by Soteria Battery Innovation Group, Inc. that thin metallized film current collector components may be utilized in place of thick, heavy, and apparently problematic metal foil materials. Such structures accord the ability to reduce potential thermal runaway as basically acting as an internal fuse to prevent heat generation due to an internal short within such a lithium-ion battery article. In such a situation, the occurrence of a short within such a battery cell would not result in deleterious high temperature damage due to the cessation of a completed internal circuit through a de facto internal fuse creation. Such thin metallized film current collectors (whether at one or both of the anode and/or cathode) impart not only such internal fuse benefits, but also accord a significant reduction in overall battery weight. The further utilization of an appropriate low-melt battery separator further creates even more improvements in this manner, allowing for significantly low chances of thermal runaway upon a short therein. The ability to not only prevent heat increase within the battery, but also to provide a second line of defense with a low-melt separator to prevent any contact between anode and cathode due to any thermal increases therein, thus allows for greater reliability for the user beyond the initial thin metallized film current collector protections. Such internal fuse capabilities within lithium-ion energy storage cells (thin film current collectors), particularly those with low resistance measurements, and thus the ability to provide high effectiveness coupled with such thermal runaway, etc., safety benefits, have been disclosed within Soteria Battery Innovation Group, Inc.-owned U.S. Pat. Nos. 10,700,339, 10,763,481, 10,854,868, 10,957,956, 11,139,510, and 11,158,860, all of which are herein incorporated entirely by reference.

Even with such safety provisions within the lithium-ion battery industry, there is still the importance of overall usefulness and economic benefits for the user/customer. Thus, of further and particular interest is the necessity for such lithium-ion batteries to impart effective and long-term (repeated) charge and discharge cycles over the life thereof. Even with improvements in thermal runaway protections and other potential safety benefits, long-term performance levels are needed, particularly in terms of cost-effectiveness for users. In other words, even with safety levels potentially unmatched, the utilization of a lithium-ion battery with a limited cycle life would be inadequate as the user would expect much more. Charge and discharge capabilities are thus necessary over a significant time period, or least in terms of actual numbers of such charge/discharge cycles, to generate a marketable lithium-ion battery device. The ability to provide both a safe energy storage device (at least in terms of thermal runaway issues) simultaneously with an appropriately long cycle life would be highly prized. To date, investigations into such possible increased cycle life concerns with lithium-ion batteries having certain safety benefits have been nonexistent. The present disclosure, however, provides results heretofore unexplored and/or understood within the pertinent industry.

As shown herein, metallized films for current collector utilization have been shown to increase safety in lithium battery cells. Other types of metallized films have been proposed (by CATL, for instance), but such disclosures have deemed that high internal resistance levels are required with any type of metallized film components, thereby providing a safety feature, but with a significant sacrifice of battery effectiveness and efficiency. As it is, nothing within the pertinent prior art discusses the capability of metallized film current collector components coupled with certain wound battery configurations for both increased safety aspects and long cycle life benefits. The present disclosure provides new developments in this specific area.

ADVANTAGES AND SUMMARY OF THE DISCLOSURE

A distinct advantage of this disclosure is the simultaneous benefit of increased thermal runaway safety levels, reduced overall weight, and unexpectedly high cycle life rates for wound lithium-ion batteries. Another distinct advantage is the ability of the current collector to stretch and recover during the battery cycling, such that it imparts high cycle life rates through different pathways, including numbers of windings, certain geometries within the subject housing, the hardness of the actual housing itself, and even the actual curvature(s) of the wound battery components therein such a housing. Thus, another distinct advantage of the disclosure is the versatility of imparting such cycle life improvements in relation to the utilization of at least one metallized thin film current collector therein and therewith with a wound configuration of the battery components thereof within such a housing.

This disclosure encompasses an energy storage cell comprising battery components within a case (housing), said battery components comprising:

an anode current collector, an anode, a cathode current collector, a cathode, at least one separator, and at least one electrolyte (liquid);

wherein said battery components exhibit a positive pole and negative pole within said case (housing); wherein said anode is a coating on said anode current collector, said cathode is a coating on said cathode current collector, said separator is interposed between said anode and said cathode; wherein at least one of said anode current collector or said cathode current collector is a metallized film comprising a polymer layer that is coated on at least one side by a conductive layer and said at least one metallized film is connected to one of said negative or said positive pole; wherein said anode current collector is electrically connected to said negative pole; wherein said cathode current collector is electrically connected to said positive pole;

wherein said anode, said anode current collector, said cathode, said cathode current collector, said separator and said electrolyte are sealed within said case (housing) with said positive pole and said negative pole each connecting electrically to the outside of said case (housing); and wherein said battery components comprise a stack of at least three layers, with said stack comprising a region that is curved with a radius of curvature less than 20 cm, preferably less than 5 cm, more preferably less than 2 cm, still more preferably less than 1 cm, yet more preferably less than 5 mm, and most preferably about 2 mm. Such a radius of curvature may exhibit a full range of from greater than 500 microns to less than 20 cm. Further encompassed herein is such an energy storage cell as defined above wherein said at least one metallized film current collector exhibits a modulus that is greater than 25 N/mm$^2$, preferably greater than 50 N/mm$^2$ or more preferably greater than 100 N/mm$^2$. Such metallized film current collector modulus should also be less than 50,000 N/mm$^2$, more preferably less than 40,000 N/mm$^2$, and more preferably less than 30,000 N/mm$^2$. To measure the modulus, ASTM D882 method should be used, considering only the total cross-sectional area without reference to the different layers of the metallized film. While the modulus is important, the extensional force is more closely related to the ability of the current collector to breathe with the battery during charge discharge cycling. The extensional force is calculated as the modulus*thickness, where the thickness is measured according to ASTM D6988. Representative values for aluminum and copper foils are showing in Table 1 below, as well as for representative metallized film current collectors suitable as components of this disclosure.

TABLE 1

CURRENT COLLECTOR EXAMPLES

| Material | Total Metal Thickness | Polymer thickness | Modulus | Extensional Force |
|---|---|---|---|---|
| Units | microns | microns | N/mm2 | N/mm |
| Aluminum Foil | 12 | 0 | 69,000 | 828 |
| Copper Foil | 8 | 0 | 117,000 | 936 |
| Polyethylene Terephthalate Film | 0 | 6 | 4,800 | 29 |
| Polyimide film | 0 | 4 | 5,000 | 20 |
| 1-6-1 Al-PET-Al | 2 | 6 | 20,850 | 167 |
| 0.7-6-0.7 Cu-PET-Cu | 1.4 | 6 | 26,027 | 193 |
| 0.5-4-0.5 Al-polyimide-Al | 1 | 4 | 17,800 | 89 |
| 0.5-4-0.5 Cu-polyimide-Cu | 1 | 4 | 27,400 | 137 |

Thus, the comparative examples (Comp. 1-4) in Table 1 represent standard metal current collectors (Comp. 1-2) and polymer films alone (Comp. 3-4). Clearly, there are stark differences with the disclosed Examples 1-4 related to metallized film current collectors.

In order to be useful for coating and processing, the metallized film current collector should have an extensional force that is more than the minimum required for such processing. Thus, the extensional force for the metallized film should be more than 1 N/mm, preferably more than 5 N/mm, and more preferably more than 10 N/mm. To optimize the ability of the metallized film to breathe with the cell as the electrode materials expand and contract, the extensional force should be less than the metal foils themselves. Thus, the metallized film current collector should have an extensional force that is less than 600 N/mm, preferably less than 400 N/mm, and more preferably less than 300 N/mm.

As well, encompassed herein is such an energy storage cell as defined above wherein said stack is constrained within said case (housing).

Furthermore, this disclosure encompasses the energy storage cell noted above wherein said at least one metallized film substrate provides expansion and contraction room for the cell as it charges/discharges by compression and decompression in response to the pressure exerted on its coated face in the normal operation of said cell. Such a cell is preferably cylindrical in shape to allow for such a wound configuration, although other shapes are possible, as well. More than one of said anode or cathode may be coated on a metallized thin film current collector, as well.

Additionally, such a disclosure encompasses the same structure as noted above wherein said at least one metallized film provides thermal separation for the cell formed on each coated face. Again, more than one of said anode or cathode may be coated on a metallized thin film current collector in such a situation.

Furthermore, said at least one metallized film as present on either or both of said anode or cathode may impart a level of reduction (if not entire prevention) of cracking or compression of the coatings in response to charge/discharge volume changes in the cell, as well.

As it concerns the cathode materials and structures that may be utilized within the disclosed energy storage device, it has been realized that lithium-ion types are not the sole possibilities. Additionally, as one of ordinary skill in the art should understand, materials including sodium ion, lithium sulfur, LMNO, and the like, and potentially even NiMH and NiCad, may be present for such a purpose. The ability to further utilize recycled lithium materials (from prior lithium batteries) may be employed as well in this situation. The utilization of a proper metallized current collector with such cathode materials is the primary issue, in other words, and such other cathode types should work well for battery safety, effectiveness, and long cycle life benefits as described herein.

Generally, the cycle life of batteries is the number of charge and discharge cycles that a battery can complete before losing performance. The cycle life of a lithium-ion battery (as well other possible energy storage devices as discussed herein below) is affected significantly by the depth of discharge, which is the amount of a battery's storage capacity that is utilized. For example, a battery that is discharged only by 20% of its full energy capacity has a much greater cycle life than a battery that is discharged more deeply by 80% of its capacity so that only 20% of its full energy charge remains. Thus, a higher life cycle would impart far longer usage life of such a battery over time due to the ability to retain a better full energy charge in such a respect. The wound battery cells of this disclosure have been found to increase such life cycle levels significantly as compared with wound batteries without any metallized thin film current collectors present.

In a battery, the movement of lithium from anode to cathode during the charge-discharge causes expansion and contraction of the anode and cathode, known in the art as breathing of the battery. In a cell with metal foil current collectors of high modulus that exhibit a radius of curvature, this breathing causes the wound portions not only to move vertically to each other, but also laterally as the metal foil current collectors act as concentric springs winding and unwinding. This repetitive lateral movement of the current collectors causes the electrodes to undergo shear stress with each cycle, and such repetitive shear stress slowly dismantles the electrodes, separating particles, cracking particles and otherwise reducing the conductive pathways that are required for the electrode to function properly. Over time after repetitive shear stress cycling, the cell stops functioning correctly. This can happen after 250, 300, 500 or 700 cycles, where a cycle is defined as a full charge and discharge cycle from 0% to 100% state of charge (with the understanding that, in actual practice, a user may actually initiate a charging process when the device exhibits more than 0% discharge and charges to a level that is less than 100% charge) where the full charge or discharge occurs within one hour, known in the art as 1 C rate. Each combination of anode and cathode material in a battery design will have voltages associated with their fully charged and fully discharged state. Thus, for cathodes made from lithium (nickel-manganese-cobalt) oxide, the voltage range is usually 2.5 V-4.2 V, which is similar for all ratios of Ni, Mn, and Co, such as found in NMC111, NMC 523, NMC 622 or NMC 811 or other representative ratios. Similarly, lithium iron phosphate may have a voltage range of only 2.5 V-3.6 V for a full charge-discharge cycle. These voltage ranges are well known in the literature and are usually specified for a specific battery design. Thus, a charge from 0% to 100% state of charge will be through the full voltage range of the battery design.

This repetitive wear can result in a decay in the capacity of the battery, which is measured by charging the battery to full voltage at 1 C rate, holding it at a constant voltage until the charge current drops to C/10, resting for 30 minutes, and then discharging at 1 C rate to the minimum specified voltage for the battery design. The capacity of the battery in standard batteries may drop below 80% of the initial capacity in 250, 300, 500 or 700 cycles. The capacity of the inventive battery may remain above 80% of the initial capacity after 250 cycles, preferably 300 cycles, more preferably 500 cycles and most preferably 700 cycles.

However, if the current collector could be made in such a way that it allowed the cell to breath without imparting shear stress, the cell could be enabled to function for many more cycles without losing the conductive pathways that cause the cell to degrade.

One way to accomplish this is if the cell is configured in a way such that there is not a radius of curvature of the metal foil current collectors, this mode of cell degradation is also alleviated. Stacked pouch cells are one example that exhibits this geometry and does not undergo this mechanism of degradation. As shown in the examples below, even under constraint, the stacked pouch cells do not undergo this mechanism of degradation and can be cycled for thousands of cycles.

Another way, as particularly disclosed herein, is for the current collector to have an elastic modulus that is so low that it stretches and recovers with each cycle, substantially and effectively eliminating the rotational motion that would otherwise be caused by a rigid current collector with a radius of curvature.

Such specific battery component configurations not only impart the desired safety levels (thermal runaway) but generate heretofore unrealized, let alone investigated, levels of cycle life improvements. Without being bound to any specific scientific theory or theories, it is believed that such highly wound structures, particularly comprising at least one metallized thin film current collector (potentially preferably two for both the anode and the cathode) allows for the aforementioned capability of expansion and contraction of the battery cell components during charging and discharging as compared with typical and traditional foil current collectors (of significantly greater thickness and reduced capacity to expand/contract). When present within the confines of the case (housing) at a high compression level, the "flexible" nature accorded the cell components through the presence of such a metallized thin film current collector (or two), particularly in a wound state, allows for expansion/contraction effect thereof, thereby creating this phenomenon of increased cycle life over time.

As alluded to above, lithium battery cells typically come in two basic configurations overall, namely a rolled or stacked format. Rolled structures are commonly known and provided either in a cylindrical or jelly-roll configuration or an extended rolled (prismatic) format (similar to a stacked formation but with a continuous structure) (and in either a hard or soft case structure). Stacked structures are known as described with the different components (anode, collector, separator, cathode) in a stacked series within the confines of the battery housing. As noted above, such typical battery configurations utilize standard monolithic, or at least relatively thick, current collectors that add weight to the overall battery, of course, and which also contribute to the drawbacks described above (high internal resistance, runaway charge potentials with shorts, etc.). Such standard configurations further utilize tabs to provide conductivity from the internal portions externally for power transfer purposes. Rolled cells generally have a tab welded directly to the current collector that is accessible from outside the cell. Stacked cells generally have a tab welded to a stack of current collectors, and the tab either is welded to an electrode that is accessible from outside the cell, or the tab itself is sealed into the case in a way that it is accessible from outside the cell. In both cases, there are direct welding connections that reach from the current collector to the outside of the cell.

As it concerns such rolled cells, it should be well understood by the ordinarily skilled artisan that there are certain end uses for which these configurations are particularly important, including, without limitation, transportation, energy storage, consumer electronics and industrial applications. Stacked formations have certain beneficial end uses, as well, and the presence of metallized thin film current collectors have been found to be particularly valuable for both safety and overall weight considerations (at least). In terms of cycle life considerations, such stacked formations (again with at least one metallized thin film current collector present) appear to already exhibit similar measures and rates to typical (i.e., standard current collector) stacked cell structures. The safety and weight benefits thus already accord significant improvements with such a coupled life cycle value result.

The rolled (wound) battery configurations, as now determined and presented within this disclosure, exhibit both such safety and weight benefits, certainly, and, again, unexpectedly, with the relaxation of the shear forces that are normally present through the use of low-spring constant current collectors, also exhibit the cycle life improvements imparted as noted above. Such cycle life improvement in this manner is, again, unique and heretofore unknown within the lithium (and other type) rechargeable energy storage device industry.

Thus, this disclosure is directed to such wound energy storage devices (such as, without limitation, battery structures) in relation to the inclusion of at least one metallized thin film current collector for the aforementioned valuable and unexpected long cycle life benefits accorded thereby.

Furthermore, such a unique wound energy storage device (again, without limitation, a battery) may include a configuration wherein each side of the metallized film of either anode or cathode (or both) current collectors makes direct contact with either of the poles of the housing. As well, such metallized films may exhibit metallization on both sides of the subject current collector(s).

For any of these metallized substrates, it is desirable to have a low thickness to facilitate increase of the energy density of the cell. Any means can be used to obtain such thickness, including calendering, compressing, hot pressing, or even ablating material from the surface in a way that reduces total thickness. These thickness-reducing processes could be done before or after metallization. Thus, it is desirable to have a total thickness of the metallized substrate of less than 25 microns, preferably less than 20 microns, more preferably less than 16 microns, and potentially most preferably less than 14 microns. Commercial polyester films have been realized with thicknesses of at most 3 microns, and even lower at 1.2 microns. These types could serve as suitable substrates and allow the total thickness of the current collector to be less than 10 microns, preferably less than 6 microns, and more preferably less than 4 microns. Such ultra-thin current collectors (with proper conductivity as described above and throughout) may allow much higher energy density with improved safety performance, a result that has heretofore gone unexplored.

It is also desirable to have low weight for these metallized substrates. This could be achieved through the utilization of low-density polymer materials such as polyolefins or other low-density polymers including polyethylene, polypropylene, and polymethylpentene, as merely examples. It could also be achieved by having an open pore structure in the substrate or even through utilization of low basis weight substrates. Thus, the density of the polymer used in the substrate material could be less than 1.4 g/cm$^3$, preferably less than 1.2 g/cm$^3$, and potentially more preferably less than 1.0 g/cm$^3$. Also, the areal density of the substrate material could be less than 20 g/m$^2$, preferably less than 16 g/m$^2$, and potentially most preferably less than 14 g/m$^2$. Additionally, the areal density of the metal coated polymer substrate material could be less than 40 g/m$^2$, preferably less than 30 g/m$^2$, more preferably less than 25 g/m$^2$, and potentially most preferably less than 20 g/m$^2$.

Low weight can also be achieved with a porous polymer substrate. However, the porosity must not be too high for these materials, as such would result in low strength and high thickness, effectively defeating the purpose of the goals involved. Thus, such base materials would exhibit a porosity lower than about 60%, preferably lower than 50%, and potentially more preferably lower than 40%. Since solid materials can be used for this type of metal coated current collector, there is no lower limit to the porosity.

High strength is required to enable the materials to be processed at high speeds into batteries. This can be achieved by the use of elongated polymers, either from drawn fibers or from uniaxially or biaxially drawn films.

As presented below in the accompanying drawings the descriptions thereof, an energy storage device, such as a battery, as again a non-limiting example, is manufactured and thus provided in accordance with the disclosure wherein at least one current collector that exhibits the properties associated with no appreciable current movement after a short is in contact with one of a cathode or an anode, or two separate current collectors are in contact with both a cathode and an anode. Additionally, at least one separator and electrolytes (of any type, preferably liquid and flammable in nature) are also present with such at least one current collector, cathode, and anode, and sealed within a standard (suitable) energy storage device container. Such a general method of providing the disclosed wound battery device is to provide a lengthy rectangular structure of all of the layers of components (cathode current collector, cathode, separator, anode, anode current collector, with at least one of the current collectors involved, preferably both, being a metallized thin film current collector as described and in contact with either or both of the cathode and/or anode, as noted above) then rolling the entirety of the rectangular into a "jelly roll" structure around a rod or dowel (or like straight structure) to form a cylindrically shaped configuration thereof for placement within the subject case (housing). In such a manner, the dowel or rod (or, again, like structure) is then removed after introduction with a case leaving a centrally disposed opening into which liquid electrolytes may then be introduced themselves for dissipation throughout the case and battery components. The end result is the application of the wound battery components such that expansion and contraction of such components within the sealed case (housing) results in lower shear forces during the breathing of the cell as the cell undergoes charge-discharge cycling. The winding numbers that may impart such a compression level may range from 3 to 300, dependent certainly upon the initial thickness of the unwound structure prior to case (housing) introduction. The presence of this utilization of such metallized thin film current collector(s) allows for a thin structure initially and thus the ability to generate a significant increase in windings for such a rolled battery structure greater than present within standard current collector-based batteries. The case (housing) may range from a standard material (soft, potentially, when a tightly wound battery components structure is utilized and introduced therein) to a significantly hardness (and thus less flexible) material to ensure the wound battery structure introduced therein retains a coiled configuration. The radius of curvature measurement(s) of the wound battery structures introduced within a case (housing) (which is then sealed, of course, as would be for all such devices disclosed herein) may be applied and thus measured. Such a radius of curvature of the battery components, as noted above, may be at most 20 cm with a lower measure of about 500 microns.

The cathode, anode, container, electrolytes, and in some situations, the separator, components are all standard, for the most part, and any material common in the industry may be used. The current collector utilized herewith and herein, however, is, as disclosed, not only a recent introduction within this battery art, but counterintuitive as an actual energy storage device component. As it concerns the separator component(s), however, one or more thereof may be provided as a low-shrink rate, and thus high temperature resistant non-woven types to impart further protection from any potential high temperature scenarios, ostensibly preventing thermal runaway by retaining separation between cathode and anode components.

As noted above, in order to reduce the chances, if not totally prevent, thermal runaway within a battery cell (particularly a lithium-ion rechargeable type, but others are possible as well, of course), there is needed a means to specifically cause any short circuit therein to basically exist within a short period of time, with reduced residence time within or on the subject current collector, and ultimately exhibit a resultant energy level of de minimis joule levels (i.e., less than 10, preferably less than 1, and most preferably less than 0.01). In such a situation, then, and as alluded to earlier, the electrical pathway from anode to cathode, and through the separator, with the thin conductive current collector in place, and organic flammable electrolyte present, it has been observed that the low-weight, thin current collector allows for such a desirable result, particularly in terms of dissipation of rogue charges at the collector surface and no appreciable temperature increase such that ignition of the electrolyte component would be imminent. Surprisingly, and without being bound to any specific scientific explanation or theory, it is believed that the conductive nature of the thin current collector material allows for short circuit electrical charges to merely reach the thin conductive current collector and immediately create a short duration high-energy event that reacts between the metal at the current collector surface with the electrical charge itself, thereby forming a metal oxide at that specific point on the current collector surface. The metal oxide provides insulation of further electrical activity and any current applied dissipates instantaneously, leaving a potential deformation within the collector itself, but with the aforementioned metal oxide present to protect from any further electrical charge activity at that specific location. Thus, the remaining current collector is intact and can provide the same capability as before, thus further providing such protections to any more potential short circuits or like phenomena. In the case of thermal runaway in prior art battery products, the anode, cathode, current collectors and separator comprise the electrical pathway which generates heat and provide the spark to ignite the cell in reaction to a short circuit, as an example. The further presence of ion transporting flammable electrolytes thus allows for the effective dangers with high temperature results associated with such unexpected electrical charges. In essence, the heat generated at the prior art current collector causes the initial electrochemical reactions within the electrolyte materials, leading, ultimately to the uncontrolled ignition of the electrolyte materials themselves. Thus, the disclosed current collector herein is, again, particularly valuable when utilized within battery cells including such flammable electrolytes. As examples, then, such electrolytes generally include organic solvents, such as carbonates, including propylene carbonate, ethylene carbonate, ethyl methyl carbonate, di ethyl carbonate, and di methyl carbonate, and others. These electrolytes are usually present as mixtures of the above materials, and perhaps with other solvent materials including additives of various types. These electrolytes also have a lithium salt component, an example of which is lithium hexafluorophosphate, $LiPF_6$. Such electrolytes are preferred within the battery industry, but, as noted, do potentially contribute to dangerous situations. Again, the disclosed current collector in association with other battery components remedies these concerns significantly and surprisingly.

The metallized substrate may be any substrate as described within this disclosure. The ion storage material may be a cathode or anode material for lithium-ion (or other type of aforementioned rechargeable) batteries, as are well known in the art. Cathode materials may include lithium cobalt oxide $LiCoO_2$, lithium iron phosphate $LiFePO_4$, lithium manganese oxide $LiMn_2O_4$, lithium nickel manganese cobalt oxide $LiNi_xMn_yCo_zO_2$, lithium nickel cobalt aluminum oxide $LiNi_xCo_yAl_zO_2$, or mixtures of the above or others as are known in the art (as noted above, such cathodes may also include, without limitation, sodium ion, sodium ion, lithium sulfur, LMNO, etc. and potentially even NiMH and NiCad).

Anode materials may include graphite, lithium titanate $Li_4Ti_5O_{12}$, hard carbon, tin, silicon or mixtures thereof or others as are known in the art, including lithium metal. In addition, anodes which expand and contract to a higher degree may achieve a much longer cycle life. These anodes include, without limitation, silicon, silicon-oxides, tin, tin oxides, lithium metal, lithium metal alloys and other high-capacity anodes for lithium-ion batteries. Some of these, such as silicon, silicon-oxide, tin and others, exhibit very high growth on cell charge and shrinkage on cell discharge. The lower modulus current collectors in this invention will be particularly suited to accommodate the dimensional changes in the anode materials, and any others that undergo such severe dimensional change on charge and discharge of the cell. Additionally, for the anode, also included is the concept of an "anode-less" battery, in which the anode is formed by charging the battery, creating a layer of lithium metal on the anode current collector which serves as the anode. In addition, the ion storage material could include those used in other energy storage devices, such as supercapacitors. In such supercapacitors, the ion storage materials will include activated carbon, activated carbon fibers, carbide-derived carbon, carbon aerogel, graphite, graphene, and carbon nanotubes. The coating process can be any coating process that is generally known in the art. Knife over-roll and slot die are commonly used coating processes for lithium-ion batteries, but others may be used as well, including electroless plating. In the coating process, the ion storage material is in general mixed with other materials, including binders such as polyvinylidene fluoride or carboxymethyl cellulose, or other film-forming polymers. Other additives to the mixture include carbon black and other conducting additives.

Other cathode and anode structures may include sodium ion battery types, including, without limitation, sodium phosphate cathode systems, sodium metal, hard carbon, Prussian blue analogues, and layered transition metal oxides.

Counterelectrodes include other electrode materials that have different electrochemical potentials from the ion storage materials. In general, if the ion storage material is a lithium-ion anode material, then the counterelectrode would be made from a lithium-ion cathode material; with a sodium ion anode material, the counterelectrode would be manufactured from a suitable sodium ion counterpart, as well. In the case where the ion storage material is a lithium-ion cathode material, then the counterelectrode might be a lithium-ion anode material. In the case where the ion storage material is a supercapacitor material, the counterelectrode can be made from either a supercapacitor material, or in some cases from a lithium-ion anode or lithium-ion cathode material. In each case, the counterelectrode would include an ion storage material coated on a current collector material, which could be a metal foil, or a metallized film such as in this disclosure.

In the layering process, the disclosed electrode is layered with the counterelectrode with the electrode materials facing each other and a porous separator between them. As is commonly known in the art, the electrodes may be coated on both sides, and a stack of electrodes formed with the inventive electrode and counterelectrodes alternating with a separator between each layer. Alternatively, as is also known in the art, strips of electrode materials may be stacked as above, and then wound into a cylinder.

Packaging materials may include hard packages such as cans for cylindrical cells, flattened hard cases or polymer pouches which may be made from plastic, aluminum, steel, laminated materials or others without restrictions from the known art. In each case, there must be two means of making electrical contact through the case that can be held at different voltages and can conduct current. In some instances, a portion of the case itself forms one means, while a different portion of the case that is electrically isolated from the first portion forms another means. In other instances, the case may be nonconducting, but allows two metal conductors to protrude through the case, often referred to as tabs.

The liquid electrolyte is typically a combination/mixture of a polar solvent and a lithium salt. Commonly used polar solvents include, as noted above, propylene carbonate, ethylene carbonate, dimethyl carbonate, diethyl carbonate, but other polar solvents, including ionic liquids or even water may be used. Lithium salts commonly utilized within this industry include, without limitation, $LiPF_6$, $LiPF_4$, $LiBF_4$, $LiClO_4$ and others. The electrolyte may also contain additives as are known in the art. In many cases, the electrolytes can be flammable, in which the safety features of the inventive metallized substrate current collectors can be advantageously preventing dangerous thermal runaway events which result in fire and damage both to the cell and external to the cell. It is interesting to note also that the extension of the cycle life of the battery can also be useful with solid electrolytes, as are commonly used in solid state lithium-ion batteries, such as ceramic, garnet, or polymer electrolytes, or composites thereof.

BRIEF DESCRIPTION OF THE DRAWINGS

FIG. 1 is a Prior Art depiction of the architecture of a wound cell, such as an 18650 cell.

FIG. 2 is a Prior Art depiction of the shrinkage as a function of temperature as measured by Dynamic Mechanical Analysis of several lithium-ion battery separators, as measured according to NASA/TM-2010-216099 "Battery Separator Characterization and Evaluation Procedures for NASA's Advanced Lithium-ion Batteries," which is incorporated herein by reference, section 3.5. Included are first generation separators (Celgard PP, Celgard tri-layer), 2nd generation separators (ceramic PE) and 3rd generation separators (Silver, Gold, Silver AR).

DETAILED DESCRIPTION OF THE PREFERRED EMBODIMENTS AND EXAMPLES

The following descriptions and examples are merely representations of potential embodiments of the present disclosure. The scope of such a disclosure and the breadth thereof in terms of claims following below would be well understood by the ordinarily skilled artisan within this area.

As noted above, the present disclosure is a major shift and is counterintuitive from all prior understandings and remedies undertaken within the lithium battery (and other energy storage device) industry. To the contrary, the novel devices described herein provide a number of beneficial results and properties that have heretofore been unexplored, not to mention unexpected, within this area. As shown within the cited references above (the Soteria Battery Innovation Group, Inc.-owned U.S. Patents), stark differences exist between prior own standard (thick) current collectors and those disclosed herein (thin metallized films).

Short Circuit Event Examples

Comparative Example 1

Figure 3A:
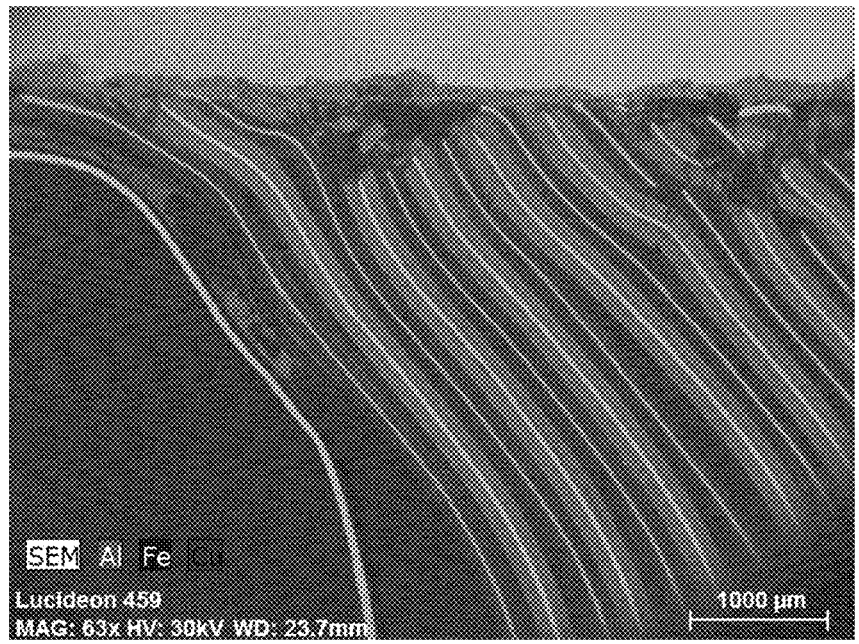
FIG. 3A is a Prior Art depiction of a scanning electron micrograph (SEM) of the cross section of a pouch cell that has undergone a nail penetration test. The layers are aluminum and copper as mapped by BEI (backscattered electron imaging). The nail is vertical on the left side. In each case, the aluminum layer has retreated from the nail, leaving behind a "skin" of aluminum oxide, an insulator.
Figure 3B:
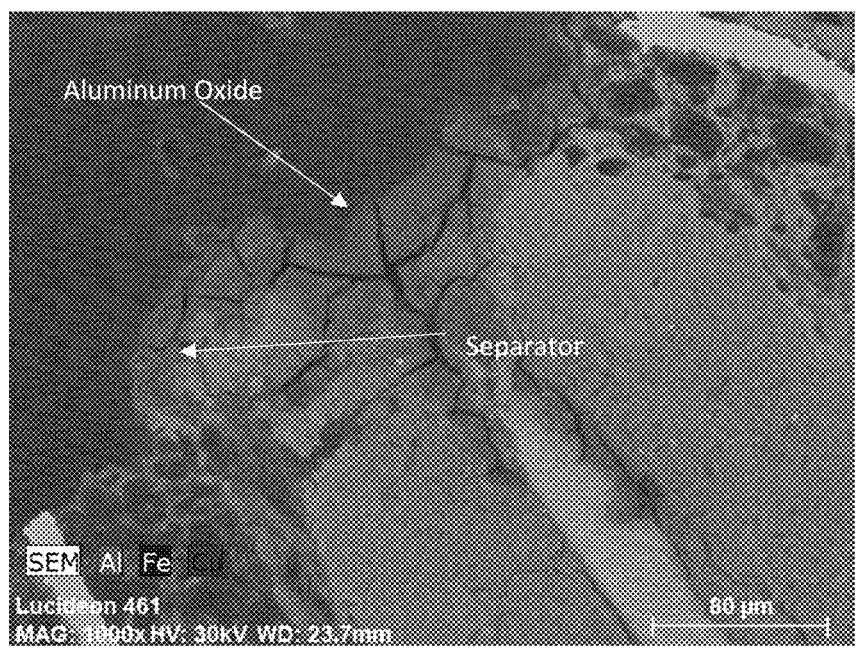
FIG. 3B is a Prior Art depiction of a zoom in on one of the layers from the image shown in FIG. 3A. It shows a close up of the aluminum oxide layer, and also reveals that the separator had not shrunk at all and was still separating the electrodes to the very edge.
Figure 4:
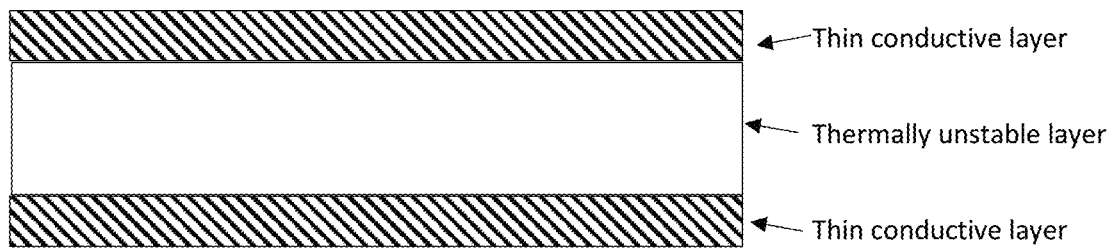
FIG. 4 is a depiction of the metallized film used in the current invention, where the thin layer of conductive material is on the outside, and the center substrate is a layer that is thermally unstable under the temperatures required for thermal runaway. This substrate can be a melting layer, a shrinking layer, a dissolving layer, an oxidizing layer, or other layer that will undergo a thermal instability at a temperature between 100° C. and 500° C.
Figure 5A:
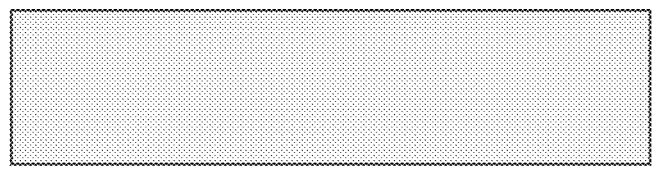
FIG. 5A is a Prior Art depiction of a thick aluminum current collector, generally between 12-20 microns thick.
Figure 6A:
FIGS. 6A and 6B show images of comparative examples 1-2, each after having been touched by the tip of a hot soldering iron. The comparative examples do not change after touching with a hot soldering iron.

A cathode for a lithium iron phosphate battery was obtained from GB Systems in China. The aluminum tab was removed as an example of a commercial current collector, and the thickness, areal density and resistance were measured, which are shown in Table 2, below. The aluminum foil was then touched with a hot soldering iron for 5 seconds, which was measured using an infrared thermometer to have a temperature of between 500 and 525° C. There was no effect of touching the soldering iron to the current collector. The thickness, areal density and resistance were measured. The material was placed in an oven at 175° C. for 30 minutes and the shrinkage measured. A photograph was taken and included in FIG. 6A. FIG. 5A provides a representation of the traditional current collector within such a comparative battery.

Comparative Example 2

Figure 5B:
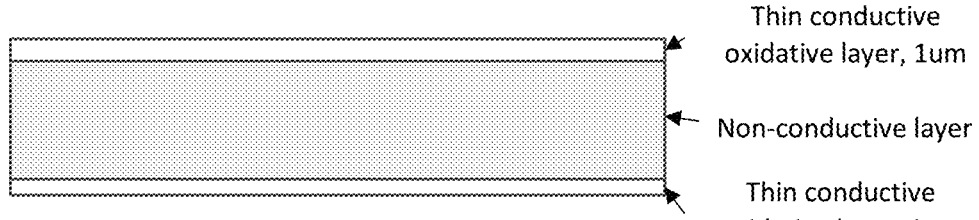
FIG. 5B is a depiction of the metallized film used in the current invention, showing a micron thick substrate with 1 micron of aluminum on each side. In the case of the inventive current collector, it is not capable of carrying the high currents associated with a short circuit, while the thick current art is and does.
Figure 6B:
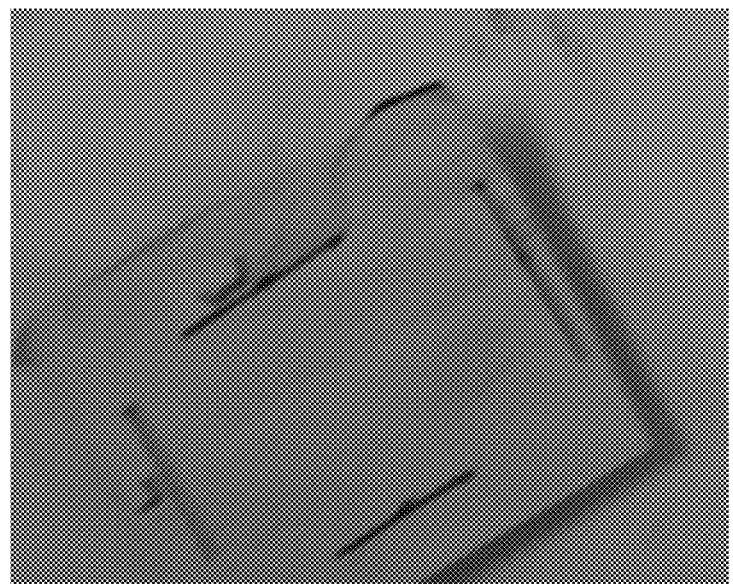

An anode for a lithium iron phosphate battery was obtained from GB Systems in China. The copper tab was removed as an example of a commercial current collector, and the thickness, areal density and resistance were measured, which are shown in Table 2, below. The copper foil was then touched with a hot soldering iron in the same way as Example 1. There was no effect of touching the soldering iron to the current collector. The thickness, areal density and resistance were measured. The material was placed in an oven at 175° C. for 30 minutes and the shrinkage measured. A photograph was taken and included in FIG. 6B. As in Comparative Example 1, FIG. 5A provides a representation of the internal structure of such a battery. The thickness of the current collector is significant as it is a monolithic metal structure, not a thin type as now disclosed. FIG. 5B provides a representation of the traditional current collector within such a comparative battery.

Example 1

Figure 7A:
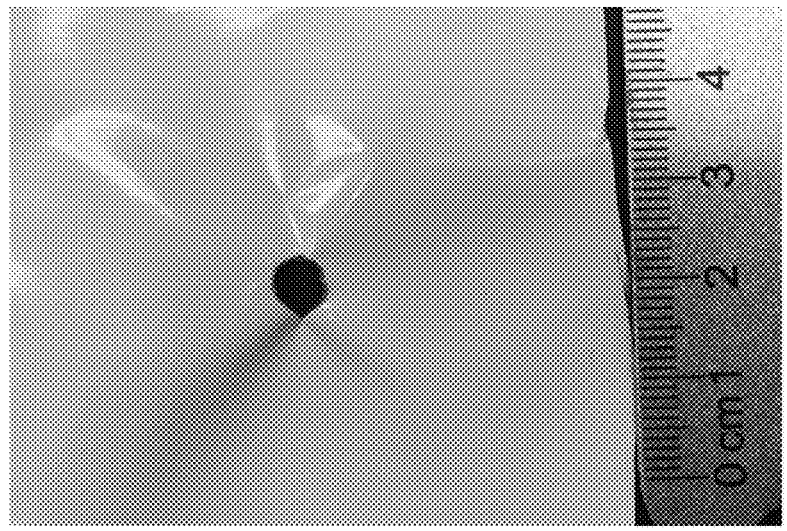
FIGS. 7A, 7B, and 7C show images of examples 1-3, each after having been touched by the tip of a hot soldering iron. The examples 1-3 all exhibit shrinkage as described in this disclosure for substrates to be metalized.

Polypropylene lithium battery separator material was obtained from MTI Corporation. The material was manufactured by Celgard with the product number 2500. The thickness, areal density and resistance were measured, which are shown in Table 2, below. The separator was then touched with a hot soldering iron in the same way as Example 1. Touching the thermometer to the current collector created a small hole. The diameter was measured and included in Table 2. The thickness, areal density and resistance were measured. The material was placed in an oven at 175° C. for 30 minutes and the shrinkage measured. A photograph was taken and included in FIG. 7A.

Example 2

Figure 7B:

Ceramic coated polyethylene lithium battery separator material was obtained from MTI Corporation. The thickness, areal density and resistance were measured, which are shown in Table 2, below. The separator was then touched with a hot soldering iron in the same way as Example 1. Touching the soldering iron to the current collector created a small hole. The diameter was measured and included in Table 2. The thickness, areal density and resistance were measured. The material was placed in an oven at 175° C. for 30 minutes and the shrinkage measured. A photograph was taken and included in FIG. 7B.

Example 3

Figure 7C:
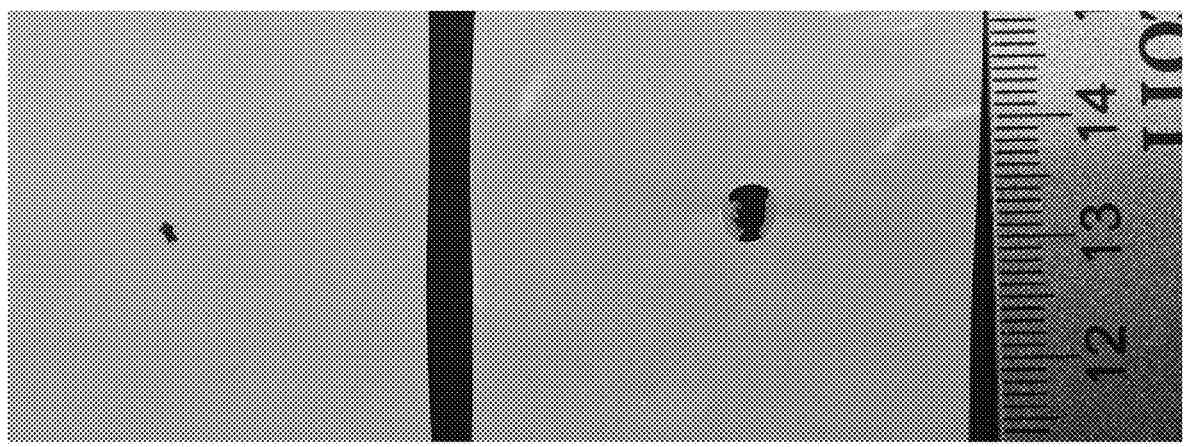

Ceramic coated polypropylene lithium battery separator material was obtained from MTI Corporation. The thickness, areal density and resistance were measured, which are shown in Table 2, below. The separator was then touched with a hot soldering iron in the same way as Example 1. Touching the soldering iron to the current collector created a small hole. The diameter was measured and included in Table 2. The thickness, areal density and resistance were measured. The material was placed in an oven at 175° C. for 30 minutes and the shrinkage measured. A photograph was taken and included in FIG. 7C.

Example 4

Figure 8A:
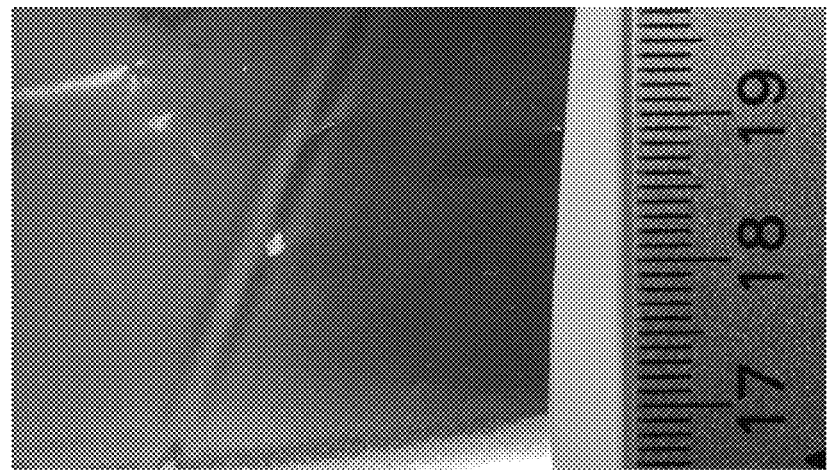
FIGS. 8A, B, and 8C shows images of examples 4-6, each after having been touched by the tip of a hot soldering iron. The example 4 exhibits shrinkage as described in this disclosure for substrates to be metalized. Example 5 has a fiber that will dissolve under heat in lithium ion electrolytes. Example 6 is an example of a thermally stable substrate that would require a thin conductive layer to function as the current invention.

Aluminized biaxially oriented polyester film was obtained from All Foils Inc., which is designed to be used for helium filled party balloons. The aluminum coating holds the helium longer, giving longer lasting loft for the party balloons. The thickness, areal density and resistance were measured, which are shown in Table 2, below. The film was then touched with a hot soldering iron in the same way as Example 1. Touching the soldering iron to the current collector created a small hole. The diameter was measured and included in Table 2. The thickness, areal density and resistance were measured. The material was placed in an oven at 175° C. for 30 minutes and the shrinkage measured. A photograph was taken and included in FIG. 8A. Compared to the commercially available aluminum current collector Comparative Example 1, this material is 65% thinner and 85% lighter, and also retreats away from heat, which in a lithium-ion cell with an internal short would have the effect of breaking the internal short.

Example 5

Figure 8B:
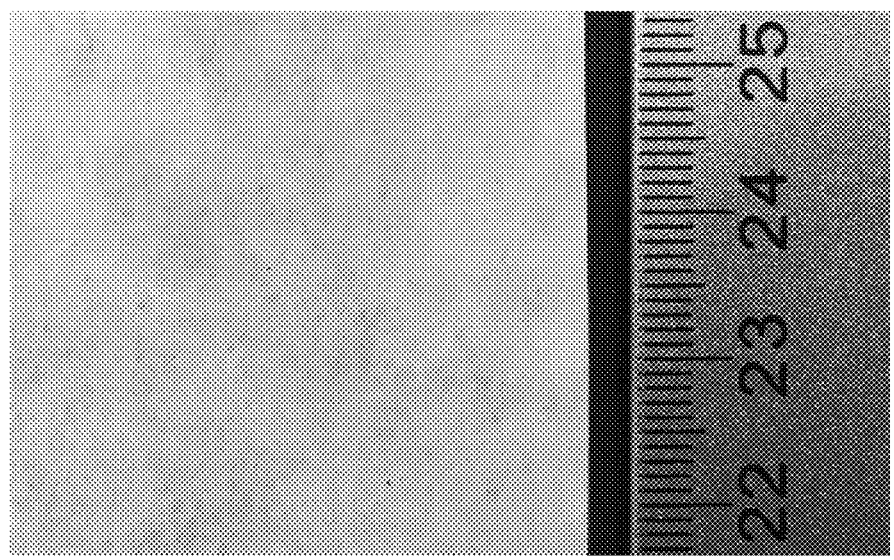

Dreamweaver Silver 25, a commercial lithium-ion battery separator was obtained. It is made from a blend of cellulose and polyacrylonitrile nanofibers and polyester microfibers in a papermaking process and calendered to low thickness. The separator was then touched with a hot soldering iron in the same way as Example 1. Touching the thermometer to the current collector did not create a hole. The thickness, areal density and resistance were measured. The material was placed in an oven at 175° C. for 30 minutes and the shrinkage measured. Compared to the prior art, comparative examples #3-5, these materials have the advantage that they do not melt or shrink in the presence of heat, and so in a lithium-ion battery with an internal short, will not retreat to create an even bigger internal short. Such is seen in FIG. 8B.

Example 6

Figure 8C:
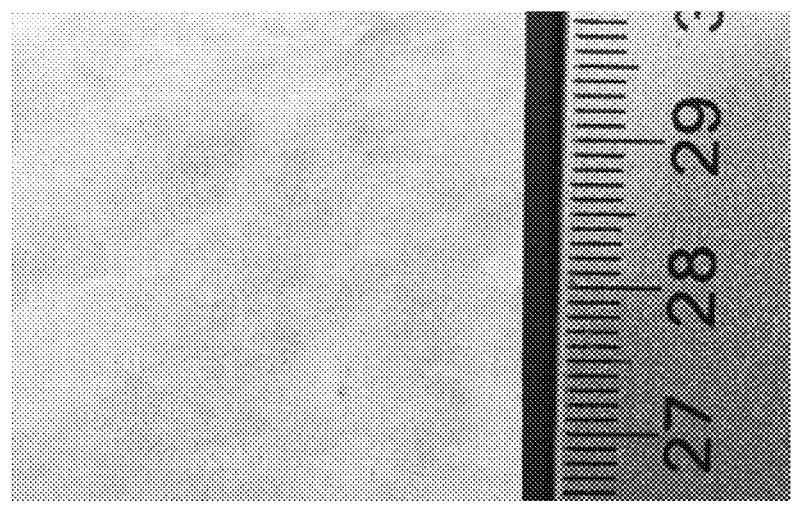

Dreamweaver Gold 20, a commercially available prototype lithium-ion battery separator was obtained. It is made from a blend of cellulose and para-aramid nanofibers and polyester microfibers in a papermaking process and calendered to low thickness. The separator was then touched with a hot soldering iron in the same way as Example 1. Touching the thermometer to the current collector did not create a hole, as shown in FIG. 8C. The thickness, areal density and resistance were measured. The material was placed in an oven at 175° C. for 30 minutes and the shrinkage measured. The advantages of this separator compared to the prior art separators are the same as for Example 2.

TABLE 2

| Example | Material | Thickness | Areal Density | Resistance | Shrinkage (175 C.) | Solder Tip Hole Size |
| --- | --- | --- | --- | --- | --- | --- |
| Comp Example 1 | Aluminum | 30 μm | 80 g/m$^2$ | <0.1 mOhm/square | 0% | No hole |
| Comp Example 2 | Copper | 14 μm | 125 g/m$^2$ | <0.1 mOhm/square | 0% | No hole |
| Example 1 | PP | 24 μm | 14 g/m$^2$ | Infinite | Melted | 7.5 μm |
| Example 2 | PP ceramic | 27 μm | 20 g/m$^2$ | Infinite | Melted | 2 μm/1 μm |
| Example 3 | PE ceramic | 27 μm | 20 g/m$^2$ | Infinite | Melted | 5 μm/2 μm |

TABLE 2-continued

| Example | Material | Thickness | Areal Density | Resistance | Shrinkage (175 C.) | Solder Tip Hole Size |
|---|---|---|---|---|---|---|
| Example 4 | Aluminized PET | 13 μm | 12 g/m² | 6.3 Ohm/square | 33% | 2 μm |
| Example 5 | Fiber blend | 27 μm | 16 g/m² | Infinite | 2% | No hole |
| Example 6 | Fiber blend | 23 μm | 16 g/m² | Infinite | 0% | No hole |
| Example 7 | Aluminized PET | 8 μm | 12.5 g/m² | 65 mOhm/square | 0% | 3 μm/2 μm |

Comparative Examples 1-2 are existing current collector materials, showing very low resistance, high areal density and no response at exposure to either a hot solder tip or any shrinkage at 175° C.

Examples 1-3 are materials that have infinite resistance, have low areal density and melt on exposure to either 175° C. or a hot solder tip. They are excellent substrates for metallization according to this invention.

Examples 4 and 7 are examples of an aluminized polymer film which shows moderate resistance, low areal density and shrinks when exposed to 175° C. or a hot solder tip. It is an example of a potential cathode current collector composite film according to this invention. In practice, and as shown in further examples, it may be desirable to impart a higher level of metal coating for higher power batteries.

Examples 5-6 are materials that have infinite resistance, have low areal density, but have very low shrinkage when exposed to 175° C. or a hot solder tip. They are examples of the polymer substrate under this invention when the thickness of the metallized coating is thin enough such that the metallized coating will deteriorate under the high current conditions associated with a short. Additionally, the cellulose nanofibers and polyester microfibers will oxidize, shrink and ablate at temperatures far lower than the melting temperatures of the metal current collectors currently in practice.

Example 5 additionally is made from a fiber, polyacrylonitrile, that swells on exposure to traditional lithium ion carbonate electrolytes, which is also an example of a polymer substrate under this invention such that the swelling will increase under heat and create cracks in the metalized coating which will break the conductive path, improving the safety of the cell by eliminating or greatly reducing the uniform conductive path of the current collector on the exposure to heat within the battery.

Constrained Cylindrical Cell Life

Of further interest herein are the unexpected benefits now discovered related to the utilization of such thin metallized film current collectors within constrained and wound battery devices and articles. Of particular benefit, and, again, unexpected in this manner, is the increase in life cycle for such constrained and wound batteries in relation specifically to the thin metallized film current collectors present therein. Such a phenomenon is described in greater detail below.

Wound Cell Examples

Figure 9:
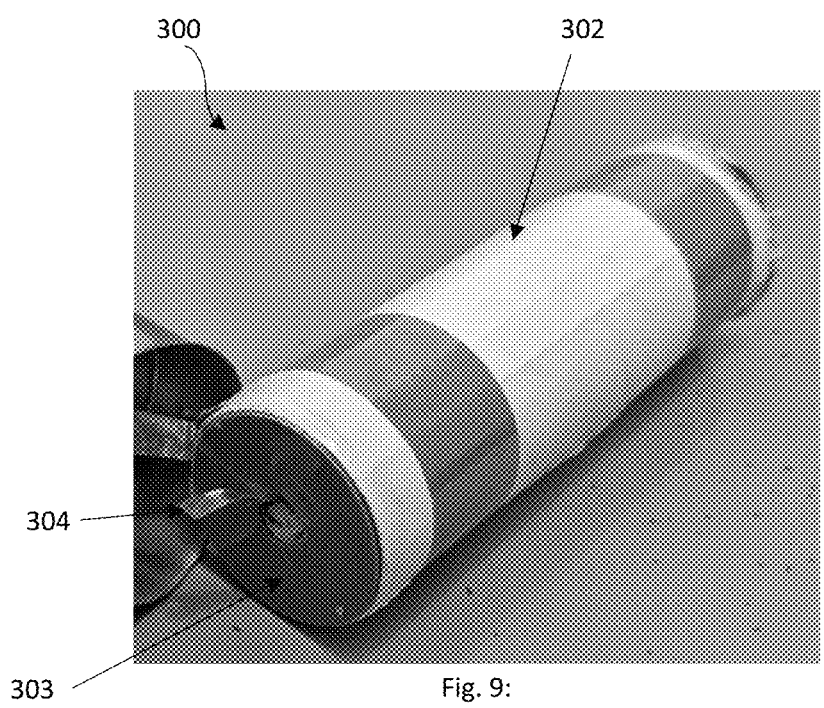
FIG. 9 is a photograph showing a rolled (wound) battery including metallized film current collectors prior to sealing within a case.
Figure 10:
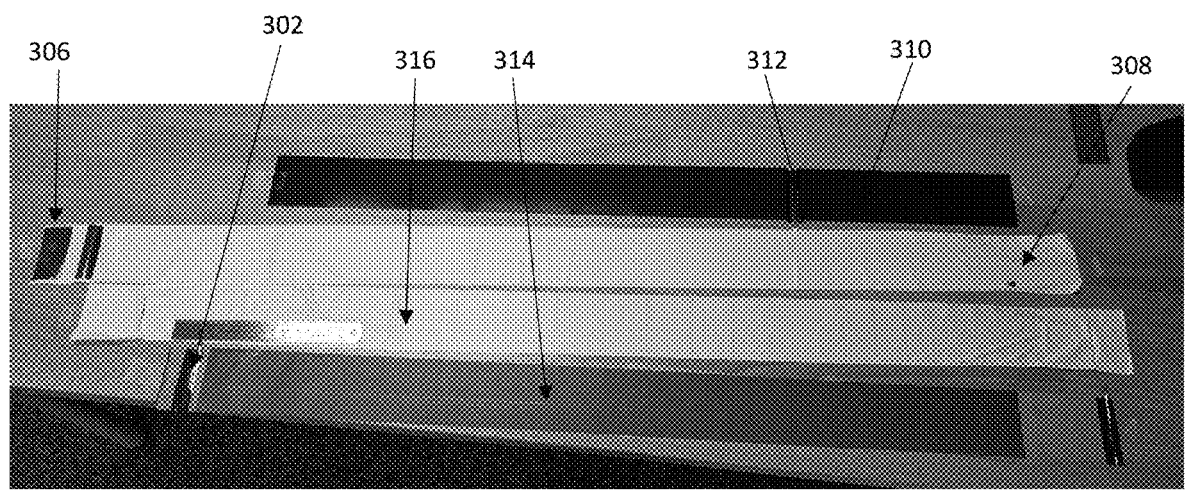
FIG. 10 is a photograph showing the unrolled battery components of the rolled battery of FIG. 9 prior to rolling (winding).
Figure 11:
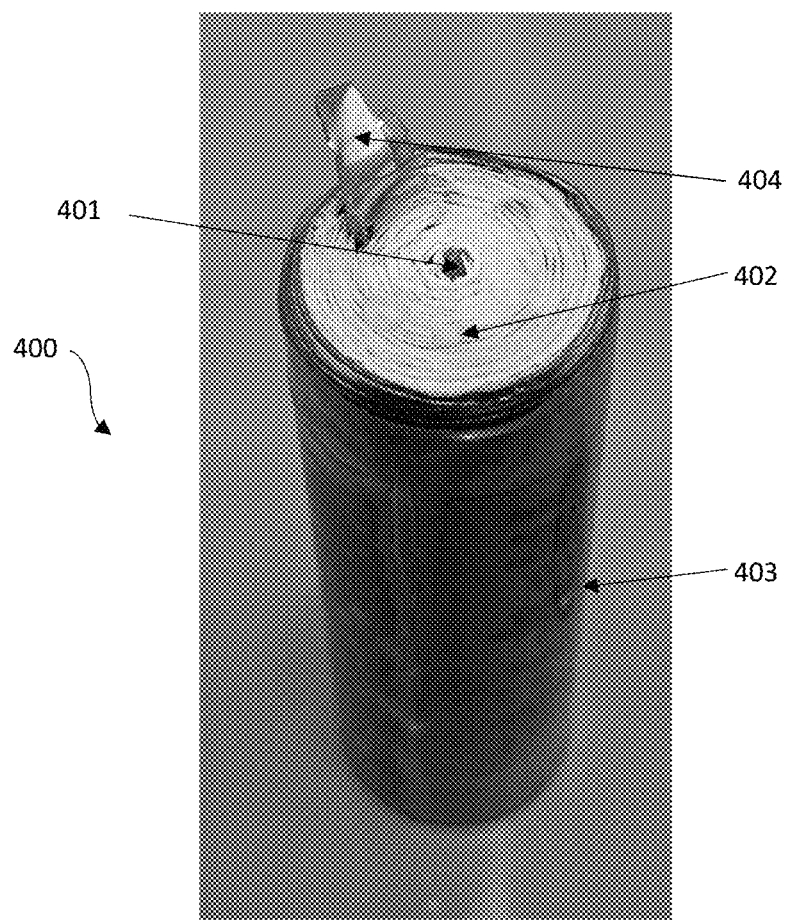
FIG. 11 is a photograph of the rolled (wound) battery of FIG. 9 subsequent to introduction within a card case (housing).

As shown in FIG. 10, separate components of a battery were initially produced for winding (FIG. 9) and eventual placement within a cylindrical housing (FIG. 11). In FIG. 10, there is shown (as a photograph) a cathode/current collector component 310, a first polymeric separator 308, a second polymeric separator 316, and an anode/current collector component 314. The cathode/current collector 310 includes a cathode tab 312. The anode/current collector 314 includes a tab 302 for external electrical connection purposes. The first separator 308 also includes a tape attachment 306 to secure the roll together as an entire composite. In practice, such battery components 310, 308, 316, 314 are arranged in layers with the cathode/current collector 310 on the bottom, the first separator 308 placed over the cathode/current collector 310, the anode/current collector 314 placed atop the first separator 308, and the second separator 316 placed atop the anode/current collector 314. The separators 308, 316 are noticeably longer than the cathode/current collector 310 and anode/current collector 314 layers in order to ensure contact between the two 310, 314 does not occur within the confines of a battery cell (such as 400 in FIG. 11). After layering as noted above, the entire layered composite is then rolled (wound) around a rod or dowel (not illustrated) to create a cylindrical structure (300 of FIG. 9, for instance). Such a rolled structure 300 includes opposing ends 303 (the opposing end not pictured but the same as 303) including the edges in rolled fashion of the components (310, 308, 316, 314, as in FIG. 10) including a tab 304 leading from the anode/current collector 314. The next step is then formation of a battery within a housing 400 (of FIG. 11) subsequent to introduction of the battery components in rolled form 402 within such a housing 403. The rod or dowel (not illustrated) is then removed to leave an opening and cylindrical cavity 401 into which liquid electrolytes (not illustrated) may then be introduced to spread/dissipate throughout the entirety of the cell. The entire battery/housing 400 may then be sealed at the top (the bottom (not illustrated) is an enclosed end which contact the bottom edge of the rolled battery components and may include a conductive area for external transfer of power therethrough. A tab 404 is present on the top of the battery components 402 (leading from an anode/current collector (314 of FIG. 10)). The top cap (not illustrated, but alluded to in FIG. 1, allows for the tab 404 to contact with a suitable conducting component (not illustrated, but, again, alluded to in FIG. 1, for power transfer external of the cell 400. The individual components 310, 308, 316, 314 of the overall cell 400 may be produced as follows:

Wound Cell Example 1

The anode/current collector was produced through the initial mixing of anode powders (graphite, for instance) with binders to form a slurry that was then coated onto the surface of a copper foil dried, and then compressed. The cathode/current collector was likewise formed in a similar fashion with cathode powders (NMC523, a nickel, manganese, and cobalt cathode combination) mixed with binders into a slurry which was then coated onto the surface of an aluminum metallized film (provided by ChangYu and disclosed above as Example 7 dried, and then compressed. The anode/current collector was then slit into the appropriate size (308 in FIG. 10) while the cathode/current collector was likewise slit into the appropriate size (314 in FIG. 10).

Additionally, the anode tab (302 in FIG. 10) was welded into place and cathode tabs (2) were also welded into place. The wet-processed polyethylene separators were then, as noted above, provided in appropriate sizes (and longer than the anode/cathode components), the battery components were then, as noted above, layered and rolled into a cylinder "jelly-roll" formation and introduced within a cell canister (cylindrical housing with a closed end). The "jelly-roll" was then inserted within the cylindrical housing and dried in a vacuum oven prior to sealing. The tabs were then welded as needed, with the anode tab (or tabs) welded to the housing canister and the cathode tab (or tabs) welded to the sealing cap. Prior to sealing, the liquid electrolytes were then filled within the cell (again within the opening/cavity remaining subsequent to dowel or rod removal), followed by sealing of the call/canister with the top cap.

Wound Cell Example 2

A second wound cell of this disclosure was also manufactured in the same basic procedure as for Wound Cell Example 1. Thus, the same manner of slurry formation and coating on metallized films was undertaken with the following parameters and specifics:

The anode was coated in Graphite on Cu foil measuring 10 microns thickness.
The cathode was coated in NMC811 on aluminized film (1+6+1) at a 45-48 mg/cm² loading level.
Both anode/current collector and cathode/current collector measured 587 mm in length and 57 mm in width.
Thus, with the same separators as above, similar "jelly-roll" cells were formed.

As it concerns the aluminized current collector components utilized within the wound cell examples of this disclosure, such films, as exhibited in Example 7, were manufactured by ChangYu, composed of, as one example, a 6-micron thick polyethylene terephthalate (PET) film with 1 micron of aluminum coated via vacuum vapor deposition therein. Overall, such aluminized film current collectors exhibited the following characteristics and properties:

TABLE 3

Aluminized Film Collector Properties

| Parameter | | Units | Typical | Test method |
|---|---|---|---|---|
| Thickness | | Um | 1 + 6 + 1 | GB/T 6672-2001 |
| Density | | g/cm³ | 1.7 | GB/T 1003.1-2008 |
| Resistivity | | 10⁻⁸Ω*m | 4.5 | Q/CYY 001-2019 |
| Tensile Strength | MD | Mpa | 120 | GB/T 1040.3 |
| | TD | Mpa | 100 | |
| Elongation at Break | MD | % | 39 | GB/T 1040.3 |
| | TD | % | 32 | |
| Firmness (Al layer shedding area) | A side | % | 0 | Q/CYY 001-2019 |
| | B side | % | 0 | |

Additionally, conductivity measurements were taken on such metallized (aluminized films with a four-point probe and utilizing VanDer Pauw measurement calculations. The results were shown to be 40.9 mΩ/□, thus providing excellent low resistance.

Figure 12:
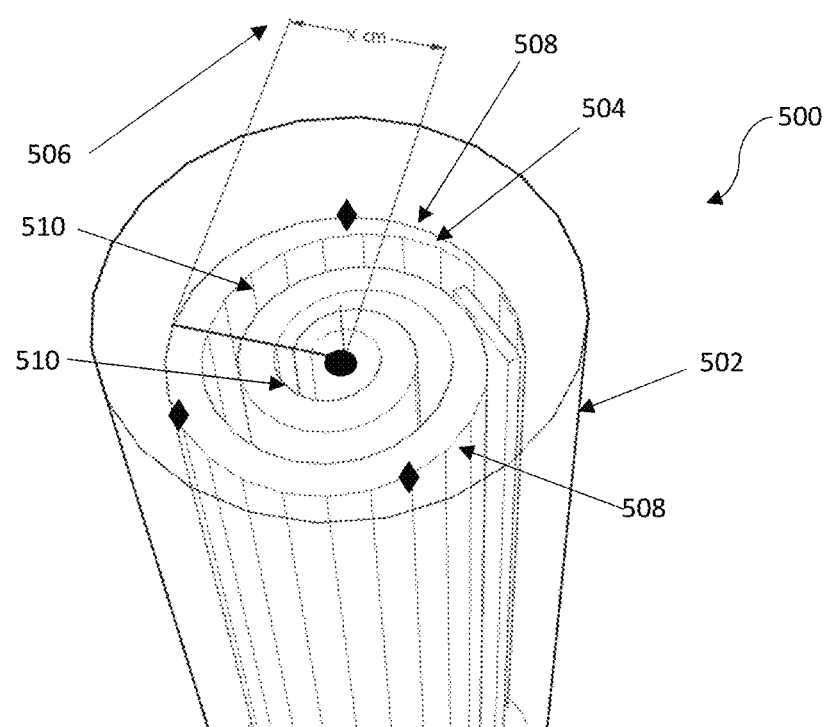
FIG. 12 is a depiction of a wound battery component structure with a curvature of X cm prior to sealing within a case (housing).

FIG. 12 provides a top perspective view of a wound ("jelly-roll") battery structure with an indication of the radius of curvature thereof. As noted above, such a radius of curvature may measure within a range of from greater than 500 microns to less than 20 cm. This radius of curvature is measured starting from the center point from the crease (for a cylindrical cell, the center of the jelly-roll, shown by black circle in FIG. 12; for an ellipsoidal shaped jelly-roll, from the foci; and for a wound cell with a folded structure as found in a prismatic, from the center point of the region with the most extreme curvature, shown by the black circle in FIG. 13). The radius of curvature is measured by ending at the outermost unit cell layer within the region of the most extreme curvature (for a cylindrical cell, the last wind of the jelly-roll on the outermost edge, examples shown with black diamonds in FIG. 12; for an ellipsoidal jelly-roll, the outermost wind of the jelly-roll measured near the adjacent vertex in the region with the most extreme curvature; and for a prismatic cell jelly-roll, the outermost wind of the jelly-roll near the region with highest curvature, examples shown as black diamonds in FIG. 13).

In this manner, the wound batteries disclosed herein that exhibit improved and unexpectedly good cycle life characteristics will be provided in relation to, in one embodiment, the range of radius of curvature measurements corresponding to this formula. FIG. 12 provides a view of an unsealed wound cell 500 having a cylindrical hard case (housing) 502 in which it is disposed. The wound structure thus exhibits a radius of curvature X 506 (which may, again be any measurement within the range described above, with a most preferably radius measurement of about 2 mm) to accord a suitable wound pressure level in relation to the hard case 502 to generate, internally, the desired level of pressure while also permitting effective shear during charging and/or discharging for maximum cycle life results. Such a battery 500 further shows the wound battery structure 504 with the external separator 508 and the internal cathode 510 (and the anode present but not discernible in the drawing), as well, in such a wound configuration. Once introduced within such a hard case (housing), the battery can then be sealed with the necessary connections of anode and cathode externally for conductance purposes.

Figure 13:
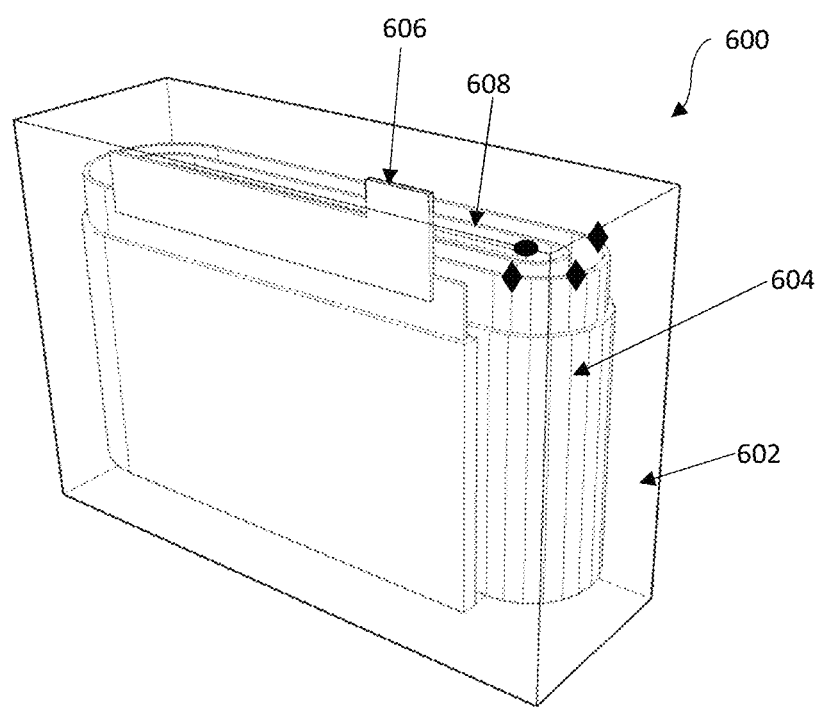
FIG. 13 is a depiction of a wound battery component structure within a prismatic hard case.

FIG. 13 shows another possible battery configuration in relation to this disclosure. In this situation, the overall case (housing) 602 is for a prismatic cell 600 including battery components 608 presented in wound fashion but in a stacked structure as well. As alluded to above, such prismatic cells 600 allow for stacked shapes for battery components, but in a continuous formation with each end provided with a radius of curvature, but the curvature provided on the opposing ends thereof and the middle portions of such components elongated to be flat. The FIG. 13 structures thus include an external separator 604 and a tab 610 for connection with one of a negative or positive pole on the external portion of the battery 600. allowing for also battery presented in relation to such. Such a prismatic cell 600 thus shows that a wound cell of any type (not necessarily a "jelly-roll" type, for instance) may utilize a critical radius of curvature measurement to ensure the unexpectedly effective long cycle life results.

Cycle Life Testing

Such manufactured wound cells (Wound Cell Examples and Comparatives) were then subjected to initial charge formations (life cycled) with the following parameters:
1 C charge CC/CV to 4.2V with cutoff current of C/10
5 min. rest
1 C discharge current CC to minimum voltage of 3 volts
5 min. rest Such cells were either in accordance with this disclosure, and thus utilizing metallized film current collectors (with anode or cathode components) or comparative cells with conventional copper and/or aluminum foil current collector components.

Figure 14:
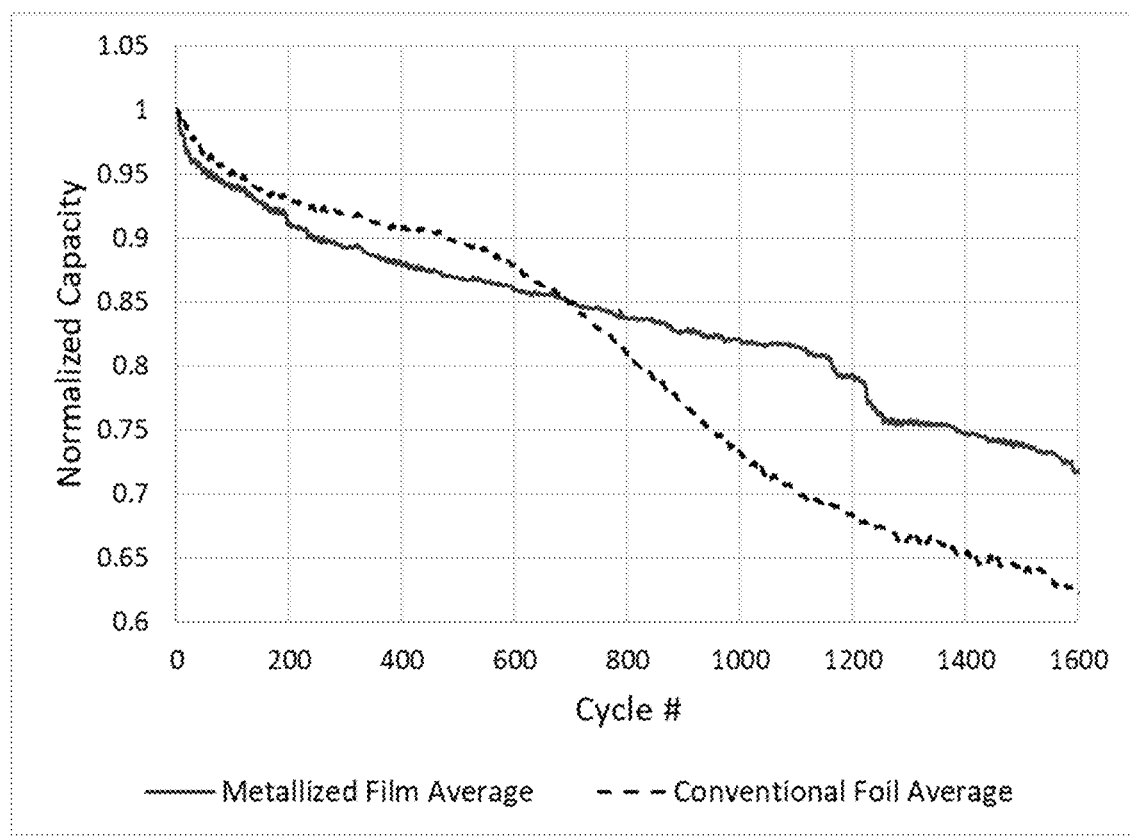
FIG. 14 is a graphical representation of cycle life rate measurements of a sealed battery cell depicted in FIG. 9 and in Wound Cell Example 1 and another comparative battery cell with a standard current collector component.
Figure 15:
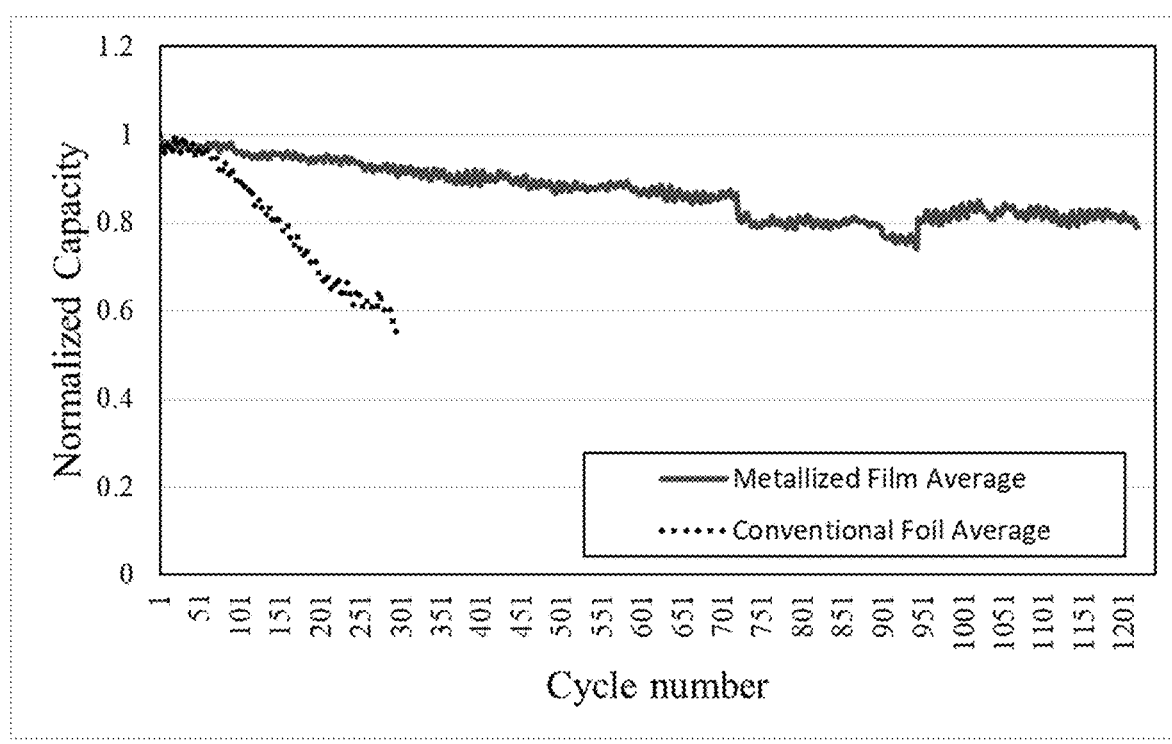
FIG. 15 is a graphical representation of cycle life rate measurements of a sealed battery cell depicted in FIG. 9 and in Wound Cell Example 2 and another comparative battery cell with a standard current collector component.

The cycle life results were measured and presented in graphical representations in FIGS. 14 and 15. As can be plainly seen, the disclosed cells (including the metallized film current collectors) exhibited far improved cycle life measurements than the standard/convention current collector cells. Such unexpectedly good results (for both wound cell examples versus the comparative standard/conventional current collector foil cells) thus show the beneficial utilization of such constrained and wound cells devices including metallized thin film current collector components. Combined with the excellent safety capabilities and properties thereof such thin metallized film current collector components, as well as the overall effectiveness of power generation and transfer therewith, such new constrained wound cells are of significant interest in this industry. The Wound Cell Examples (1 and 2) showed a significant increase in cycle life compared with the comparative (standard/conventional) current collector examples.

An additional comparative experiment was undertaken to determine the effect of metallized film current collectors within stacked, unwound, battery structures. For this test, pouch cells (produced by SVolt) were provided in constrained formation between two plates with stacked electrodes alone (but, again, with metallized film current collectors present). Such a configuration thus included stacked anode, cathode, and current collector(s) components, but a separator (or separators) was provided either stacked (as the other components) or folded between each stack layer. In such formations, then, the metallized film current collector (which may be electrode-coated) was inserted individually between any separator folds. Without a wound structure for the metallized film current collector(s), the pouch cells were constrained between two plates and then cycled. The results showed the metallized film does not provide any noticeable benefit through mechanical compliance in the through-plane direction of the cell. As shown above, such metallized film current collectors that impart beneficial cycle times for cells that contain regions with extreme metallized film current collector curvature (through the hypo thesis of metallized film stretching upon the swelling that occurs in a charging and discharging cell). With such a nearly identical result of cycle time performance for stacked, rather than wound, electrodes (e.g., the performance of constrained volume stacked pouched is evident that the utilization of constrained wound metallized film current collectors is critical or unexpectedly improved cycle time results. Batteries including metallized film current collectors as disclosed herein provide much better cycle time performance within constrained wound structures in comparison to constrained wound structures including standard metal current collector types. Thus, the criticality of structures, whether in terms of curvature measurements or applied constrained forces is shown herein as the unexpectedly high cycle time measurements generated in association with such metallized film current collectors have heretofore been unknown and unexplored within this art.

Thus, it has been shown that the wound examples with the disclosed thin metallized film current collectors therein (provided and described above) not only exhibit the desirable thickness, metal coating, and conductivity results needed to prevent thermal runaway within an electrolyte-containing battery, thereby providing not only a much safer and more reliable type, but one that requires far less internal weight components than ever before, without sacrificing safety, but, in fact, improving thereupon; additionally, such measured results indicate long life cycle lithium-ion wound (rolled) battery cells that have heretofore been unavailable within the industry. With such unique and heretofore unexplored battery cells including thin film current collectors within wound sealed structures, a reliable, safer, and more thorough electrically conducting device is provided. Any type of electrolyte may likewise be present as long as the metallized thin film current collector(s) is/are present, including, flammable liquid organic electrolytes, gelling electrolytes, and possible solid electrolytes (though no equivalency between such electrolytes is intended with such a disclosure; liquid flammable electrolytes are potentially preferred). There is thus provided a novel approach to utilizing thin metallized film current collectors within lithium-ion (and like) batteries, capacitors, power cells, etc., for effective power transfer and reduced thermal runaway potential.

Having described the invention in detail it is obvious that one skilled in the art will be able to make variations and modifications thereto without departing from the scope of the present disclosure. Accordingly, the scope of the present invention should be determined only by the claims appended hereto.

What is claimed is:

1. An energy storage cell comprising battery components within a case (housing), said battery components comprising:
    an anode current collector,
    an anode,
    a cathode current collector,
    a cathode,
    at least one separator, and
    at least one electrolyte;
    wherein said battery components exhibit a positive pole and negative pole within said case (housing); wherein said anode is a coating on said anode current collector, said cathode is a coating on said cathode current collector, and said separator is interposed between said anode and said cathode; wherein at least one of said anode current collector or said cathode current collector is a metallized film current collector comprising a polymer layer that is coated on at least one side by a conductive layer, wherein said metallized film current collector exhibits a modulus that is greater than 25 N/mm$^2$ and less than 30,000 N/mm$^2$, and wherein said at least one metallized film current collector is connected to one of said negative or said positive pole; wherein said anode current collector is electrically connected to said negative pole; and wherein said cathode current collector is electrically connected to said positive pole;
    wherein said anode, said anode current collector, said cathode, said cathode current collector, said separator and said electrolyte are sealed within said case (housing) with said positive pole and said negative pole each connecting electrically outside of said case (housing); and
    wherein said battery components comprise a stack of at least three layers, with said stack comprising a region that is curved with a radius of curvature of less than 20 cm and of greater than 500 microns.

2. The energy storage cell of claim 1 wherein said at least one metallized film substrate provides expansion and contraction room for said cell as it charges/discharges by compression and decompression in response to a pressure exerted on its coated face in the normal operation of said cell.

3. The energy storage cell of claim 2 wherein said expansion and contraction room within said cell is imparted through at least one of the following:
 1) reduced modulus of said battery components, including an extensional force less than 400 N/mm exhibited by said at least one metallized film current collector,
 2) the utilization of a specific type of case (housing) of a maximum hardness level,
 3) the numbers of windings of such said battery components within such a case (housing), and
 4) cells comprising a section of electrode with a radius of curvature of less than 10 cm.

4. The energy storage cell of claim 2 wherein said cell is cylindrical in shape.

5. The energy storage cell of claim 1 wherein said cell is cylindrical in shape.

6. The energy storage cell of claim 1 wherein said radius of curvature is at most about 5 cm.

7. The energy storage cell of claim 6 wherein said radius of curvature is at most about 1 cm.

8. The energy storage cell of claim 7 wherein said radius of curvature is at most about 5 mm.

9. The energy storage cell of claim 8 wherein said radius of curvature of is at least about 2 mm.

10. The energy storage device of claim 1 wherein said modulus of said at least one metallized film current collector exhibits a modulus that is greater than 50 N/mm$^2$ and less than 30,000 N/mm$^2$.

11. The energy storage device of claim 10 wherein said modulus of said at least one metallized film current collector exhibits a modulus that is greater than 100 N/mm$^2$ and less than 30,000 N/mm$^2$.

12. The energy storage cell of claim 1 wherein said at least one metallized film current collector exhibits an extensional force which is more than 1 N/mm, and less than 600 N/mm.

13. The energy storage cell of claim 10 wherein said at least one metallized film current collector exhibits an extensional force which is more than 5 N/mm and less than 400 N/mm.

* * * * *